Inventor,
Maurice Mathy
by Lawrence Laugh...

UNITED STATES PATENT OFFICE.

MAURICE MATHY, OF LIEGE, BELGIUM.

FURNACE.

1,349,899.  Specification of Letters Patent.  Patented Aug. 17, 1920.

Application filed June 26, 1919. Serial No. 307,029.

*To all whom it may concern:*

Be it known, that I, MAURICE MATHY, manufacturer, a subject of the King of Belgium, and resident of Liege, in the Kingdom of Belgium, have invented certain new and useful Improvements in or Relating to Furnaces; and I do hereby declare the following to be a full, clear, and exact description of the invention, such as will enable others skilled in the art to which it appertains to make and use the same, reference being had to the accompanying drawing, and to letters or figures of reference marked therein, which form a part of this specification.

The present invention relates to a reverberatory furnace to which is connected a producer for generating gas to be burned in the furnace.

The invention has special reference to a furnace of the type indicated which, in addition to the gas producer, is provided with an arrangement for enabling the heating of the furnace to be effected by means of liquid fuel.

The invention resides in the provision, in a furnace of the character aforesaid, of a third heating means consisting of a burner of the flameless combustion type; the essential feature of the invention being the particular position selected for this burner and the particular manner in which it is arranged. The burner is disposed in a vertical conduit hollowed in the hearth and leading thereinto at its upper part. This conduit is filled with granular porous and refractory material, in the midst of which the air and gas introduced through separate openings mix together and burn according to the procedure in flameless combustion.

Figure 1:
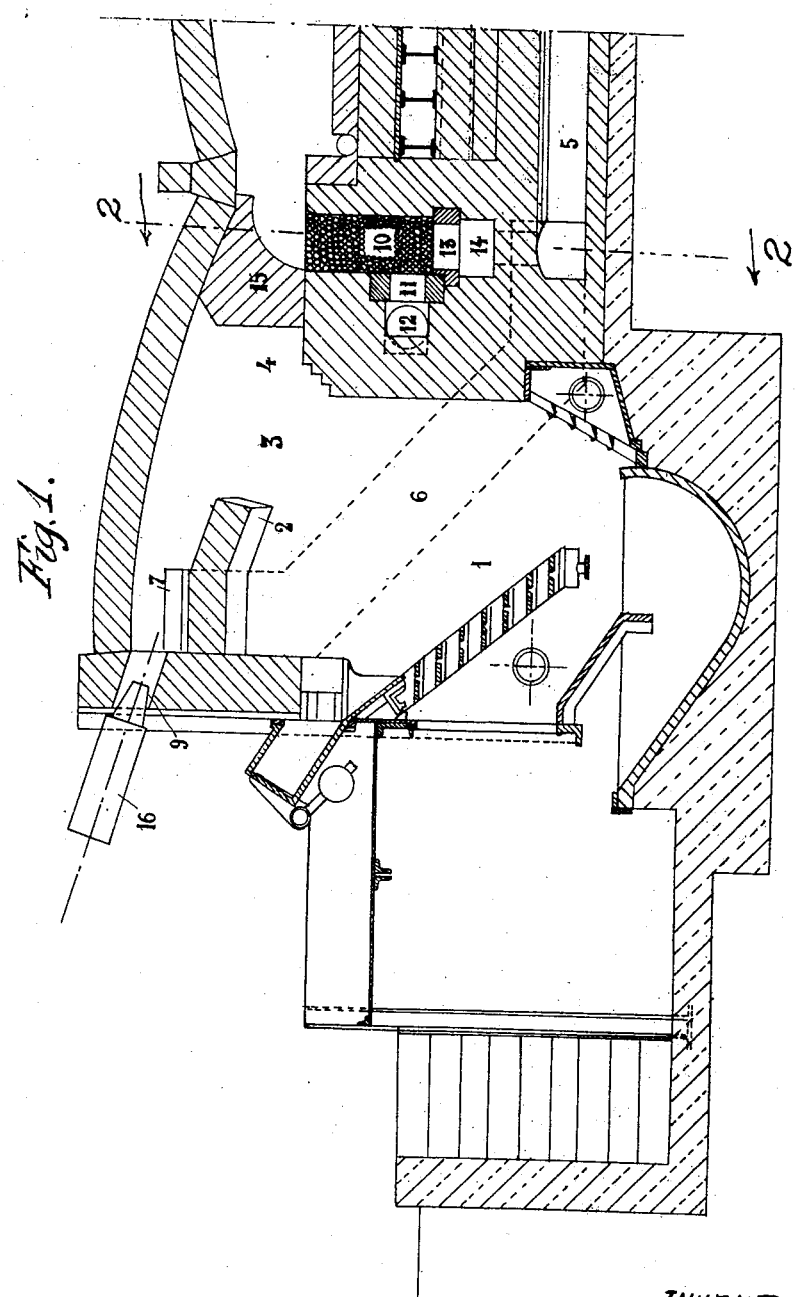
Figure 2:
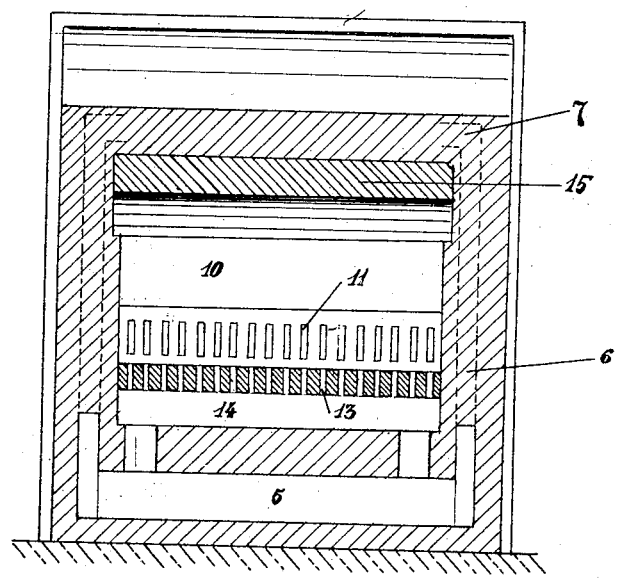

The accompanying drawing illustrates by way of example a construction according to the invention. Figure 1 of the drawing shows a vertical sectional view of a portion of the furnace to which the invention has been applied and which can be of any desired type; and Fig. 2 is a vertical cross section taken on line 2—2 of Fig. 1, in the plane of the flameless combustion burner.

The chamber of the producer 1 is divided into two parts by an arch 2 leaving at 3 a passage between the producer and the conduit 4. which latter provides communication between the producer and the hearth of the furnace. A conduit 5 supplying air (for instance from a recuperator) is in communication through the conduit 6 (shown dotted in the wall of the producer) with an opening 7 above the arch 2.

An opening 9 provided in the face of the producer above the arch 2 makes it possible to inject liquid fuels (paraffin, heavy oils, etc.) into the space above the arch, by an apparatus 16.

In the conduit 4 providing communication between the producer and the hearth of the furnace, is arranged a flameless combustion burner. It consists of a cavity 10 filled with porous refractory material and receives gas through openings 11 leading from the conduit 12 and air through openings 13 leading from the conduit 14 branched off the hot air pipe 5, as represented in Fig. 2. The said openings or slots 11 and 13 can be with advantage staggered in order to assist the mixing of the air and gas.

When the burner 10 is used alone, a block 15 closes the communication with the producer. But if it is desired to use either gas from the producer, or liquid fuels, the said block 15 is removed, and by a suitable set of valves, air is admitted through the opening 7. This air is used to burn the producer gas or the liquid fuel, and the flame thus produced at 3 penetrates into the hearth through the conduit 4.

It will be seen that it is possible to use at will, for heating the furnace, either separately or together, the burner 10, the injector 16 and the producer 1.

Obviously, by arranging suitable conduits, it is possible to supply wholly or in part the burner 10 with gas generated in the producer 1.

What I claim is:

1. A reverberatory furnace having a producer for generating gas for heating the furnace, and also having a burner for liquid fuel, and a flameless combustion burner comprising a cavity hollowed out in the hearth of the furnace and filled with a mass of porous, refractory granular material, in the interstices of which a gaseous mixture is adapted to burn.

2. A reverberatory furnace having a producer for generating gas for heating the furnace, and also having a burner for liquid fuel; and a flameless combustion burner comprising a cavity hollowed out in the hearth of the furnace and filled with a mass of porous, refractory granular material;

said cavity having air inlets formed in its bottom, and gas inlets formed in one side wall adjacent said bottom, the air and gas uniting in the interior of the mass of material to form a gaseous mixture adapted to burn therein.

3. A refractory furnace having a producer for generating gas for heating the furnace, and also having a burner for liquid fuel; a flameless combustion burner comprising a cavity hollowed out in the hearth of the furnace and filled with a mass of porous, refractory granular material; said cavity having air inlets formed in its bottom, and gas inlets formed in one side wall adjacent said bottom, the air and gas uniting in the interior of the mass of material to form a gaseous mixture adapted to burn therein; and a removable block for closing communication between the producer and the hearth when the said flameless combustion burner is used alone.

In testimony whereof I affix my signature in presence of two witnesses.

MAURICE MATHY.

Witnesses:
LEONARD LERA,
GEORGE S. VANDER HAEGELEN.